(12) United States Patent
Kanagawa et al.

(10) Patent No.: US 7,407,112 B2
(45) Date of Patent: Aug. 5, 2008

(54) CARD APPARATUS AND METHOD OF PRODUCING THE SAME

(75) Inventors: Kiyoshi Kanagawa, Yokohama (JP); Masanobu Okada, Omihachiman (JP); Naoki Kitahora, Gifu (JP); Yutaka Ida, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 11/852,749

(22) Filed: Sep. 10, 2007

(65) Prior Publication Data

US 2008/0017719 A1 Jan. 24, 2008

Related U.S. Application Data

(63) Continuation of application No. PCT/JP2005/023060, filed on Dec. 15, 2005.

(30) Foreign Application Priority Data

Mar. 17, 2005 (JP) ............................. 2005-077536

(51) Int. Cl.
*G06K 19/06* (2006.01)
(52) U.S. Cl. ....................... 235/492; 235/487
(58) Field of Classification Search ................. 235/492, 235/487; 455/575.5
See application file for complete search history.

(56) References Cited

U.S. PATENT DOCUMENTS

2002/0034966 A1 3/2002 Saito et al.
2004/0014507 A1* 1/2004 Okako et al. ............. 455/575.5
2005/0042990 A1 2/2005 Otsuki

FOREIGN PATENT DOCUMENTS

| JP | 09-107228 A | 4/1997 |
|---|---|---|
| JP | 11-219418 A | 8/1999 |
| JP | 11-261274 A | 9/1999 |
| JP | 2000-057299 A | 2/2000 |
| JP | 2001-237625 A | 8/2001 |
| JP | 2002-9519 A | 1/2002 |
| JP | 2002-368526 A | 12/2002 |
| JP | 2003-223239 A | 8/2003 |
| JP | 2005-65145 A | 3/2005 |

OTHER PUBLICATIONS

Official communication issued in the International Application No. PCT/JP2005/023060, mailed on Apr. 4, 2006.

* cited by examiner

*Primary Examiner*—Lisa M Caputo
(74) *Attorney, Agent, or Firm*—Keating & Bennett, LLP

(57) ABSTRACT

A card apparatus includes a card case housing a circuit substrate, a case main body and an extended portion made of resin material and being disposed integrally with the case main body. The extended portion accommodates one end side portion of the circuit substrate. The case main body includes a metal cover disposed opposite to at least one of the front surface and the back surface of the circuit substrate. A metal cover extension extending from the metal cover and constituted of a first conductive plate is embedded in a case wall constituting the extended portion, and a second conductive plate constituting an antenna element is embedded in the case wall constituting the extended portion, the second conductive plate being provided at a predetermined distance apart from the metal cover extension.

8 Claims, 5 Drawing Sheets

CARD APPARATUS AND METHOD OF PRODUCING THE SAME

BACKGROUND OF THE INVENTION

1. Field of the Invention

The present invention relates to card apparatuses, such as PC cards and CF cards, and a method of producing the same. Compact Flash (CF) is a trademark owned by the CompactFlash Association.

2. Description of the Background Art

FIG. 10A illustrates a schematic plan view of an example of card apparatuses; FIG. 10B illustrates a schematic side view of the card apparatus illustrated in FIG. 10A; and FIG. 10C illustrates a cross-sectional view taken along line A-A in FIG. 10A. A card apparatus 1 includes a circuit substrate 2 and a card case 3 accommodating the circuit substrate 2. On the circuit substrate 2, components (not shown) for configuring a circuit are mounted and a circuit pattern (not shown) is formed. The components and the circuit pattern constitute a circuit.

The card case 3 includes a case main body 5 that accommodates substantially the entire area of the circuit substrate 2 except for an end area of the circuit substrate 2 and an extended portion 6 disposed integrally with the case main body 5 to accommodate the end area of the circuit substrate 2. The case main body 5 includes a metal cover 7 disposed opposite to the front surface of the circuit substrate 2 and a metal cover 8 disposed opposite to the back surface of the circuit substrate 2, and frames 9 (9A and 9B) constructed of resin material and disposed on areas outside both side surfaces of the circuit substrate 2 as single units with the metal covers 7 and 8.

The extended portion 6 is constructed of resin material. The extended portion 6 extends from a front surface side of the end area of the circuit substrate 2 over the outer area of the end surface of the circuit substrate 2 to the back surface side of the end area of the circuit substrate 2.

There are card apparatuses 1 that have a wireless communication function. A card apparatus 1 having a wireless communication function includes an antenna. The antenna provided for the card apparatus 1 may be, for example, a rod-shaped antenna protruding outward from the card case 3 or a surface-mounted antenna disposed on the substrate surface of the circuit substrate 2. Since the card apparatus 1 having a wireless communication function must include an antenna such as that described above, there are problems in that the number of components included in the card apparatus is increased compared with that included in a card apparatus not having an antenna, and such a card apparatus 1 tends to be large and the assembling process of the card apparatus 1 becomes complicated.

The circuit on the circuit substrate 2 housed inside the card case 3 of the card apparatus 1 generates heat when a current is applied. The generated heat causes the temperature inside the card case 3 to increase and, also, causes the temperature of the metal covers 7 and 8 to increase. If the user of the card apparatus 1 touches the heated metal covers 7 and 8, for example, the heat may cause the user to experience an unpleasant sensation.

SUMMARY OF THE INVENTION

In order to overcome the problems described above, preferred embodiments of the present invention provide a circuit substrate and a card case for accommodating the circuit substrate that solve the above-described problems.

According to a preferred embodiment of the present invention, a card case includes a case main body and an extended portion being constituted of resin material and being disposed integrally with the case main body, the extended portion accommodating one end of the circuit substrate. The case main body includes a metal cover disposed opposite to at least one of the front surface and the back surface of the circuit substrate. A metal cover extension extending from the metal cover and including a first conductive plate is embedded in a case wall constituting the extended portion, and a second conductive plate constituting an antenna element is embedded in the case wall constituting the extended portion, the second conductive plate being provided at a predetermined distance apart from the metal cover extension.

According to a preferred embodiment of the present invention, the second conductive plate constituting the antenna element is embedded in the case wall constituting the extended portion of the card case. More specifically, since the second conductive plate constituting the antenna element constitutes a portion of the extended portion of the card case, the number of components used to assemble the card apparatus can be reduced compared to when the second conductive plate constituting the antenna element and the card case are provided separately. Moreover, by reducing the number of components, the assembling process of the card apparatus can be simplified.

According to a preferred embodiment of the present invention, the metal cover extension extending from the edge of the metal cover is embedded in the case wall of the extended portion of the card case. According to this configuration, the heat of the metal cover is transmitted to the extended portion, being easily diffusible through the extended portion. Therefore, compared with when the metal cover extension is not provided, temperature increases in the metal cover can be prevented. According to a preferred embodiment of the present invention, the second conductive plate constituting the antenna element is also embedded in the case wall of the extended portion of the card case. For example, in some cases, at least one power feeding element arranged to directly and electrically connect a circuit on the circuit substrate and the second conductive plate constituting the antenna element in the case wall of the extended portion is provided. In such a case, the second conductive plate constituting the antenna element in the case wall of the extended portion of the card case is also thermally connected to the circuit substrate by the at least one power feeding element. Therefore, part of the heat generated at the circuit on the circuit substrate is transmitted to the second conductive plate constituting the antenna element via the at least one power feeding element and is diffused from the second conductive plate constituting the antenna element to the extended portion. In this way, temperature increases in the circuit substrate can be prevented, and the amount of heat generated from the circuit substrate can be reduced. As a result, a temperature increase in the metal cover caused by the heat generated at the circuit substrate can be prevented.

When the card apparatus is to be housed inside a slot for card insertion of an apparatus, such as a personal computer, the extended portion of the card case projects outward from the slot. According to a preferred embodiment of the present invention, the metal cover extension and the second conductive plate constituting the antenna element are both embedded in the extended portion. As described above, the metal cover extension and the second conductive plate constituting the antenna element allow heat, which causes a temperature increase in the metal cover, to easily diffuse to the case wall of the extended portion. Therefore, the heat causing a temperature increase in the metal cover is radiated from the extended portion to the outside through the metal cover extension and the second conductive plate constituting the antenna element, efficiently suppressing temperature increases in the metal cover.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 10A:
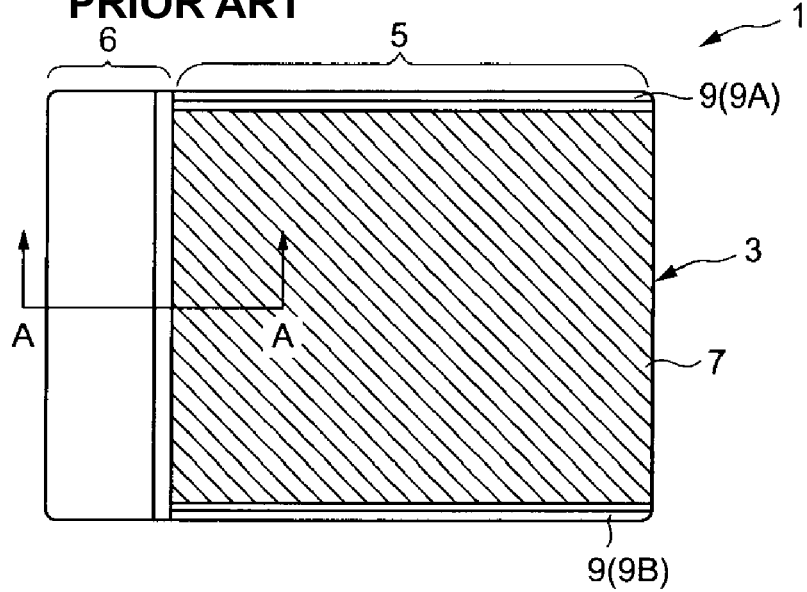
FIG. 10A illustrates a known card apparatus.
Figure 10B:
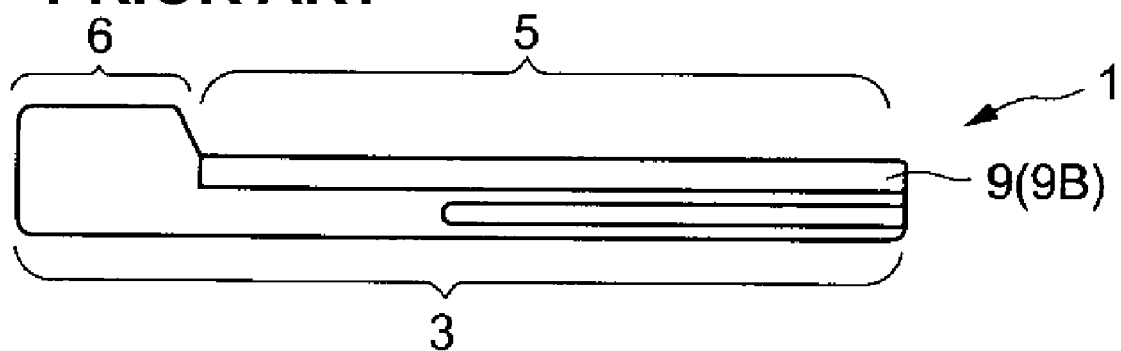
FIG. 10B is a schematic side view of the card apparatus illustrated in FIG. 10A.
Figure 10C:
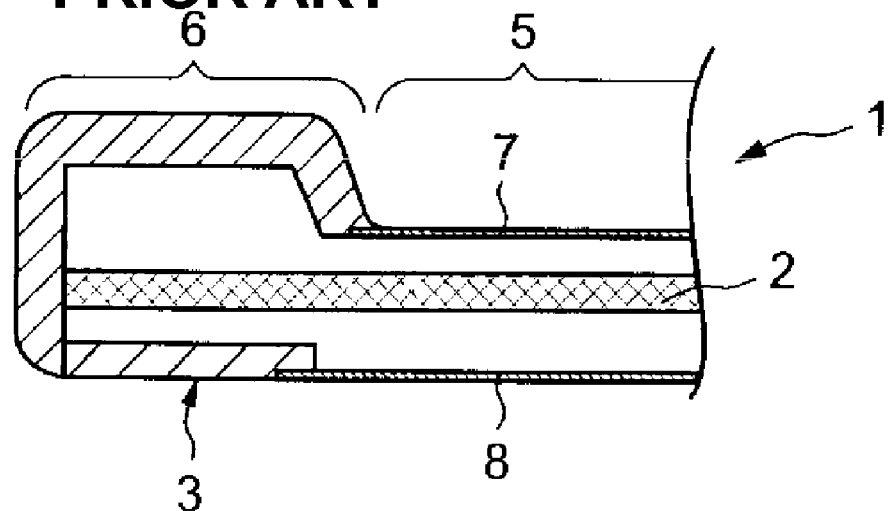
FIG. 10C is a partial cross-sectional view of the card apparatus illustrated in FIG. 10A.

Preferred embodiments of the present invention will be described below with reference to the drawings. In the following descriptions of the preferred embodiments, the same components as those included in the card apparatus illustrated in FIGS. 10A to 10C are indicated with the same reference numerals, and descriptions therefore are not repeated.

Figure 1:
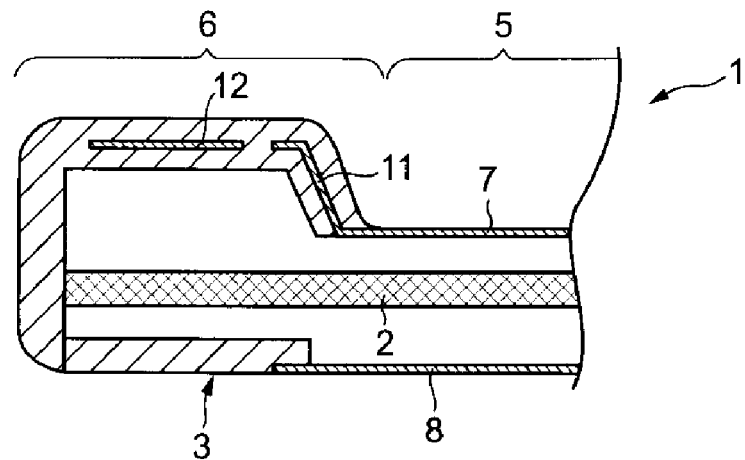
FIG. 1 is a schematic cross-sectional view illustrating a characteristic portion of a first preferred embodiment of the present invention.

FIG. 1 illustrates a schematic cross-sectional view of a characteristic portion of a card apparatus according to a first preferred embodiment of the present invention. Similar to the card apparatus 1 illustrated in FIGS. 10A to 10C, a card apparatus 1 according to the first preferred embodiment preferably includes a circuit substrate 2 and a card case 3 accommodating the circuit substrate 2. The card case 3 includes a case main body 5 and an extended portion 6. The case main body 5 includes a metal cover 7 disposed opposite to the front surface of the circuit substrate 2, a metal cover 8 disposed opposite to the back surface of the circuit substrate 2, and frames 9 (9A and 9B) constructed of resin material and disposed on outer areas of both side surfaces of the circuit substrate 2.

The extended portion 6 of the card case 3 is preferably constructed of resin material. The extended portion 6 is configured such that it extends from a front surface side of the end area of the circuit substrate 2 over the outer area of the end surface of the circuit substrate 2 to the back surface side of the end area of the circuit substrate 2. According to the first preferred embodiment, a metal cover extension 11 including a conductive plate extending from the metal cover 7 is embedded in a part of the extended portion 6 on the side opposing the front surface of the circuit substrate. According to the first preferred embodiment, a conductive plate 12 is also embedded in the part of the extended portion 6 on the side opposing the front surface of the circuit substrate, a predetermined distance apart from the metal cover extension 11. The card apparatus 1 according to the first preferred embodiment has a wireless communication function, and the conductive plate 12 constitutes an antenna element for carrying out wireless communication.

More specifically, the size, shape, and the like of the conductive plate 12 for constituting the antenna element embedded in the case wall of the extended portion 6 are designed so that the conductive plate can carry out an antenna operation by resonating at a resonance frequency set in advance for wireless communication and an antenna characteristic defined in advance by a specification and so on is achieved. Structural elements including the size and shape of the conductive plate 12 may vary. Here, the size, shape, and so on of the conductive plate 12 are set appropriately by taking into consideration the specification. Therefore, detailed descriptions thereof are omitted. The conductive material constituting the conductive plate 12 may be the same conductive material (for example, stainless) as that constituting the metal cover 7 and the metal cover extension 11 or may be a different conductive material. In other words, the conductive material constituting the conductive plate 12 may be selected suitably in accordance with the method of producing the card case 3 and the antenna characteristic.

Figure 2:
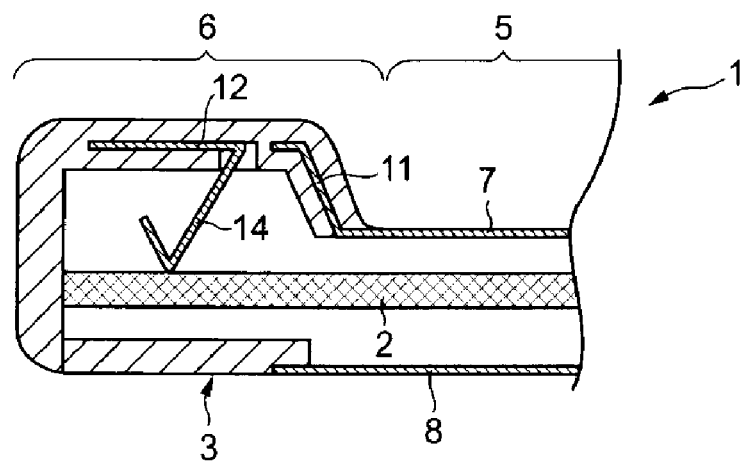
FIG. 2 is a model diagram illustrating an example of connecting elements arranged to electrically connect a conductive plate to configure an antenna element in a circuit for wireless communication on a circuit substrate.

According to the first preferred embodiment, a circuit for wireless communication used to carry out wireless communication is provided on the circuit substrate 2. A connecting member (power feeding element) arranged to electrically connect the conductive plate 12 to the circuit for wireless communication on the circuit substrate 2 is provided on the card apparatus 1. FIG. 2 illustrates an example of the connecting member. A connecting member 14, illustrated in FIG. 2, includes a conductive body and extends from the conductive plate 12 to the circuit substrate 2 inside the card case 3, through the case wall of the extended portion 6. A section of the connecting member 14 on the circuit substrate 2 side is arranged to contact-connect with an electrode pad (not shown) so as to connect the circuit for wireless communication, the electrode pad being provided on the substrate surface of the circuit substrate 2. The electrode pad arranged to connect the circuit for wireless communication is electrically connected to the circuit for wireless communication on the circuit substrate 2. The conductive plate 12 is electrically connected to a circuit for wireless communication on the circuit substrate 2 via the connecting member 14 and the electrode pad for connecting the circuit for wireless communication.

According to the first preferred embodiment, the conductive plate 12 and the connecting member 14 are preferably constructed of the same metal plate. The metal plate used to form the conductive plate 12 and the connecting member 14 is folded at the boundary line between the area where the conductive plate 12 is provided and the area where the connecting member 14 is provided. In such a folded state, the part corresponding to the conductive plate 12 is embedded in the case wall of the extended portion 6. For the section of the connecting member 14 on the circuit substrate 2 to be able to apply an urging force to the circuit substrate 2 when the circuit substrate 2 is disposed at a predetermined position inside the card case 3, where the connecting member 14 is provided, the folding angle of the conductive plate 12 and the connecting member 14, the length, and so on between the folding position and a section of the connecting member 14 contacting the circuit substrate are designed by taking into consideration the distance between a section of the extended portion 6 opposing the front surface of the circuit substrate and the circuit substrate 2. Therefore, according to the first preferred embodiment, the section of the connecting member 14 on the circuit substrate resiliently pressure-contacts the surface of the circuit substrate 2. More specifically, according to the first preferred embodiment, the section where the metal is folded between the conductive plate 12 and the connecting member 14 provides a configuration for the connecting member 14 to resiliently pressure-contact the surface of the circuit substrate.

Since the connecting member 14, illustrated in FIG. 2, is preferably constituted of the same metal plate as the conductive plate 12 constituting the antenna element, the number of components can be reduced compared with a case in which the connecting member for electrically connecting the conductive plate 12 for constituting the antenna element and the circuit for wireless communication on the circuit substrate 2 is provided separately because the connecting member 14 is provided as a single unit with the conductive plate 12. According to the configuration of the connecting member 14 illustrated in FIG. 2, the conductive plate 12 and the circuit for wireless communication on the circuit substrate 2 can be electrically connected by resiliently pressure-contacting the section of the connecting member 14 on the circuit substrate 2 to a predetermined position on the circuit substrate 2. Therefore, the assembling operation of the card apparatus 1 can be simplified even more.

When the temperature of the circuit substrate 2 increases because of the heat generated at the circuit, the heat of the circuit substrate 2 can be radiated to the extended portion 6 of the card case 3 through the connecting member 14 and the conductive plate 12. In this way, temperature increases in the circuit substrate 2 can be prevented, and the temperature increase of the metal covers 7 and 8 caused by the heat of the circuit substrate 2 can be prevented. Moreover, since the structure of the connecting member 14 is simple, the conductive plate 12 and the circuit for wireless communication on the circuit substrate 2 can be electrically connected by a simple structure. In this way, the structure of the card apparatus 1 having a wireless communication function is prevented from becoming complex.

The card apparatus 1 according to the first preferred embodiment is preferably configured as described above. According to the first preferred embodiment, the conductive plate 12 constituting the antenna element, embedded inside the case wall of the extended portion 6 of the card case 3, is capable of transmitting and/or receiving radio waves for wireless communication.

According to the first preferred embodiment, the connecting member arranged to electrically connect the conductive plate 12 to the circuit for wireless communication on the circuit substrate 2 is preferably as shown in the example illustrated in FIG. 2. However, the conductive plate 12 may be electrically connected to the circuit for wireless communication on the circuit substrate 2 by, for example, the following configuration. As shown in the schematic cross-sectional view illustrated in FIG. 3, an opening 15 exposing a portion of the conductive plate 12 is provided on the inner surface of the case wall of the extended portion 6 opposing the front surface of the circuit substrate. A connecting member 16 including a conductive plate is attached to the circuit substrate 2. The connecting member 16 is extended from the circuit substrate 2 to the conductive plate 12, through the opening 15, and is contact-connected to the conductive plate 12. The section of the connecting member 16 attached to the circuit substrate is electrically connected with the circuit for wireless communication on the circuit substrate 2. The connecting member 16 electrically connects the conductive plate 12 and the circuit for wireless communication on the circuit substrate 2.

According to this preferred embodiment, one end of the connecting member 16 is a fixed end attached to the circuit substrate 2, whereas the other end (i.e., the end closer to the conductive plate constituting the antenna element) is a free end. The free end of the connecting member 16 can be resiliently displaced with respect to the fixed end. Here, the connecting member 16 is designed so that, when the circuit substrate 2 is housed inside the card case 3 at a set position, the free end of the connecting member 16 contact-connects to the conductive plate 12 constituting the antenna element through the opening 15 of the extended portion 6 of the card case 3, and an urging force is applied to the conductive plate 12.

Figure 3:
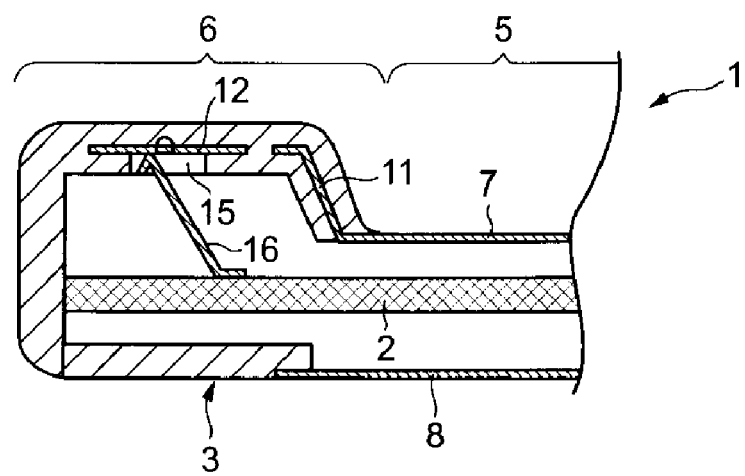
FIG. 3 is a model diagram illustrating another example of connecting elements arranged to connect a conductive plate to configure an antenna element in a circuit for wireless communication on a circuit substrate.

When the connecting member 16, illustrated in FIG. 3, is provided, similar to when the connecting member 14, illustrated in FIG. 2, is provided, the assembly process of the card apparatus 1 can be simplified. Moreover, heat of the circuit substrate 2 can be radiated to the extended portion 6 of the card case 3 through the connecting member 16 and the conductive plate 12. Therefore, temperature increases in the circuit substrate 2 can be prevented, and the temperature increase of the metal covers 7 and 8 caused by the heat generated at the circuit substrate 2 can be prevented. Moreover, since the connecting member 16 has a simple structure, the structure of the card apparatus 1 having a wireless communication function can be prevented from becoming complicated. Furthermore, when the connecting member 16, illustrated in FIG. 3, is provided, the opening 15 for exposing a portion of the conductive plate 12 is formed in the inner wall of the extended portion 6 of the card case 3. Therefore, heat generated at the circuit substrate 2 can be transmitted to the conductive plate 12 through the air inside the card case 3 and the opening 15 in the inner wall of the extended portion 6 and can be diffused to the case wall of the extended portion 6. This also contributes to preventing a temperature increase in the circuit substrate 2, so that a temperature increase in the metal covers caused by the temperature increase of the circuit substrate can be prevented.

The structures of the connecting members 14 and 16 illustrated in FIGS. 2 and 3 are examples, and the structure of a connecting member for electrically connecting the conductive plate 12 embedded inside the case wall of the extended portion 6 of the card case 3 to the circuit for wireless communication on the circuit substrate 2 is not limited to that illustrated in FIG. 2 or 3. The conductive plate 12 may be electrically connected to the circuit for wireless communication on the circuit substrate 2 with a connecting member having a structure other than that illustrated in FIG. 2 or 3.

A second preferred embodiment will be described below. In the description of the second preferred embodiment, the components that are the same as those according to the first preferred embodiment are represented by the same reference numerals as those according to the first preferred embodiment, and descriptions thereof are not repeated.

Figure 4:
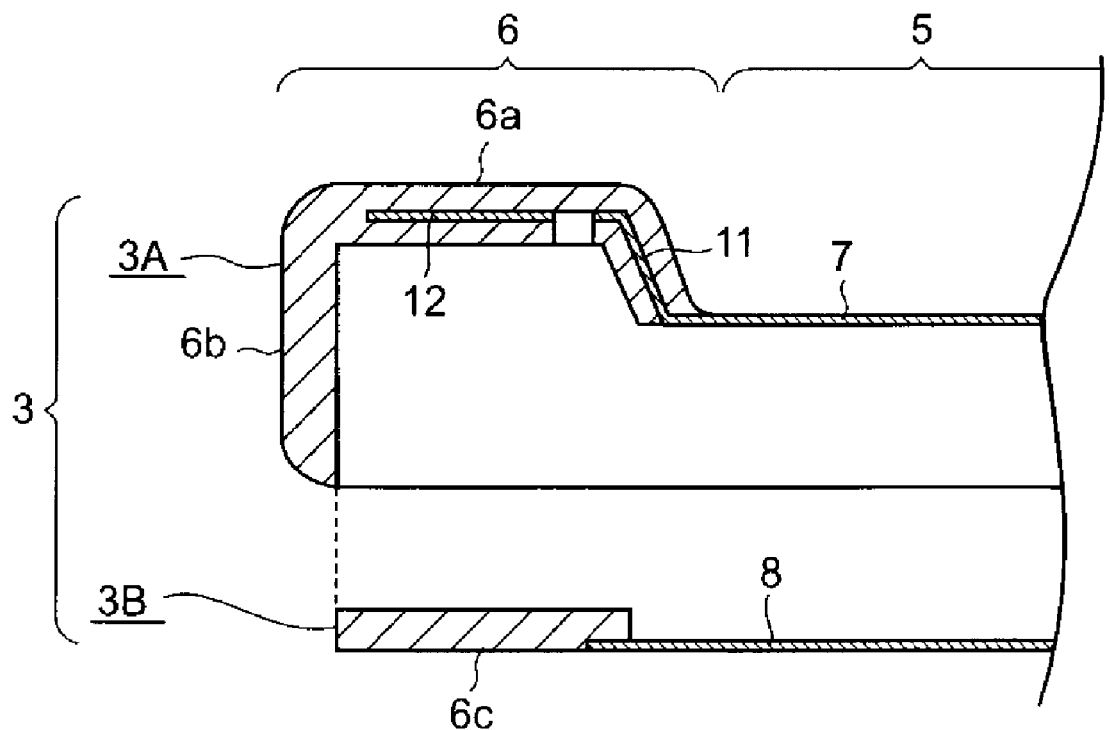
FIG. 4 is a cross-sectional view illustrating an example card case constituting a card apparatus according to a second preferred embodiment of the present invention.

According to the second preferred embodiment, a card apparatus 1 has a similar structure as that according to the first preferred embodiment, wherein a metal cover extension 11 extended from a metal cover 7 and a conductive plate 12 are embedded in the case wall of an extended portion 6 of a card case 3. An example production process of the card apparatus 1 will be described below. According to the second preferred embodiment, as shown in the exploded schematic cross-sectional view in FIG. 4, the card case 3 is constructed by combining a front-side case portion 3A including, as a single unit, the metal cover 7, frames 9, and a section 6A opposing the front surface of the circuit substrate and an end section 6B of the extended portion 6, and a back-side case portion 3B including, as a single unit, a metal cover 8 and a section 6C opposing the back surface of the circuit substrate of the extended portion 6. According to the second preferred embodiment, the extended portion 6 and the frames 9 are preferably composed of the same resin material.

Figure 5:
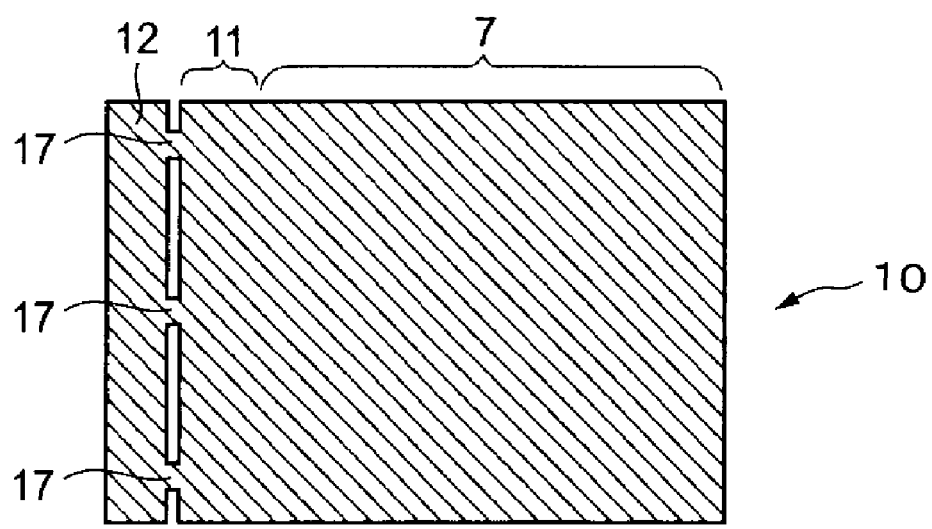
FIG. 5 illustrates an example production process of a card apparatus.

First, a conductive plate 10, such as that illustrated in the plan view in FIG. 5, is obtained. The conductive plate 10 is constructed by connecting the metal cover extension 11 of the metal cover 7 to the conductive plate 12 for constituting the antenna element with a coupling element 17. The conductive plate 10 is folded into a predetermined shape.

Figure 6A:
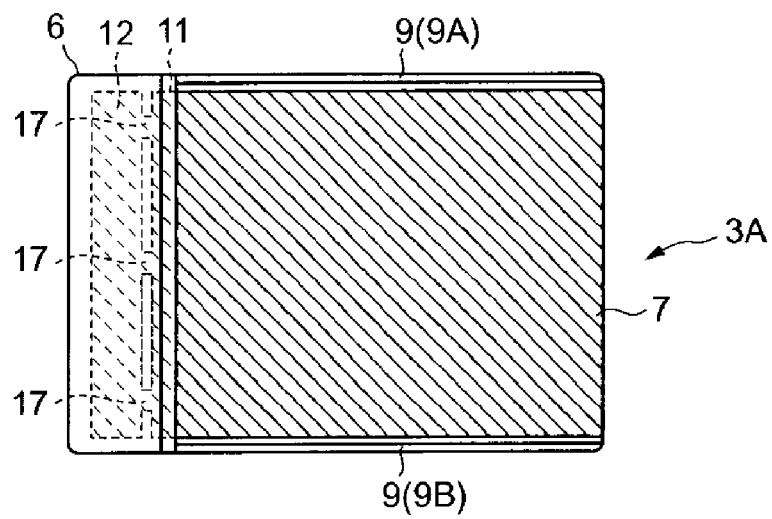
FIG. 6A, together with FIG. 5, illustrates an example of a production process of a card apparatus.
Figure 6B:
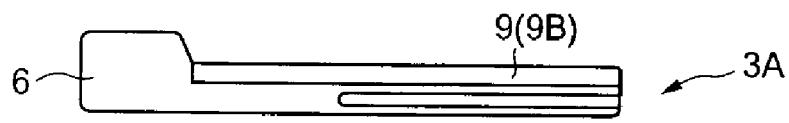
FIG. 6B, together with FIGS. 5 and 6A, illustrates an example of a production process of a card apparatus.
Figure 6C:
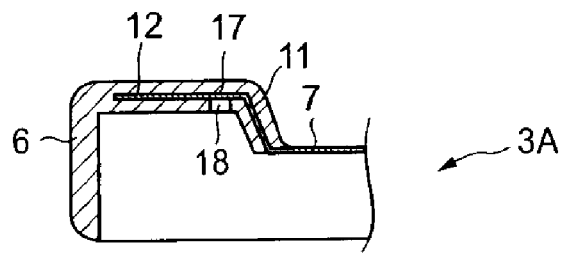
FIG. 6C, together with FIGS. 5, 6A, and 6B, illustrates an example of a production process of a card apparatus.

Subsequently, a metal mold used for injection-molding (for example, insert molding) of the front-side case portion 3A of the card case 3 is obtained, and the conductive plate 10 is disposed at a predetermined position in the metal mold. Then, melted resin material is injected into the metal mold and cured to form the section 6A opposing the front surface of the circuit substrate and the end section 6B of the extended portion 6, and the frames 9. In this way, as shown in the schematic plan view in FIG. 6A and the schematic side view in FIG. 6B, the frames 9 (9A and 9B) where the side edges of the metal cover 7 are embedded, and the extended portion 6 where the metal cover extension 11 and the conductive plate 12 are embedded are configured. When forming the extended portion 6, a hole 18 exposing the coupling element 17 is formed in the extended portion 6 on the inner side of the case, as shown in the schematic cross-sectional view in FIG. 6C.

Then, by using the hole 18, the coupling element 17 is cut to separate the metal cover extension 11 and the conductive plate 12. In this way, the front-side case portion 3A of the card case 3 is produced.

The back-side case portion 3B is also produced. For example, first, the metal cover 8 is obtained. A metal mold used for injection-molding (for example, insert molding) of the back-side case portion 3B is obtained. Then, the metal cover 8 is disposed in the mold at a set position. Subsequently, resin material for forming the extended portion 6 is injected into the metal mold and is cured. In this way, the back-side case portion 3B having a structure in which one of the ends of the metal cover 8 is embedded in the section 6C opposing the back surface of the circuit substrate of the extended portion 6 is produced.

Subsequently, the front-side case portion 3A is disposed opposite to the front surface of the circuit substrate 2, which is produced separately, and the back-side case portion 3B is disposed opposite to the back surface of the circuit substrate 2. The front-side case portion 3A and the back-side case portion 3B are combined and bonded together.

In this way, the card apparatus 1 can be produced.

In the injection molding process of the extended portion 6 according to the second preferred embodiment, the conductive plate 12 is disposed inside the metal mold for forming the extended portion 6 and the conductive plate 12 is connected to the metal cover extension 11 of the metal cover 7 at the coupling element 17. Therefore, the conductive plate 12 can be easily positioned inside the metal mold for molding, and the extended portion 6 can be easily produced with the conductive plate 12 embedded at a position in accordance with the predetermined design.

A third preferred embodiment will be described below. In the description of the third preferred embodiment, the components that are the same as those according to the first and second preferred embodiments are represented by the same reference numerals as those according to the first and second preferred embodiments, and descriptions thereof are not repeated.

Figure 7:
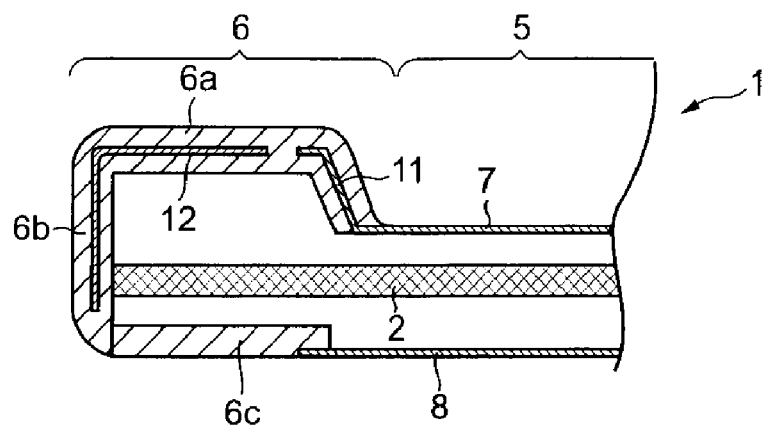
FIG. 7 is a schematic cross-sectional view illustrating a characteristic portion of a third preferred embodiment of the present invention.

According to the third preferred embodiment, as shown in the schematic cross-sectional view in FIG. 7, a conductive plate 12 embedded inside the case wall of an extended portion 6 extends from a section 6A opposing the front surface of a circuit substrate to an end section 6B of the extended portion 6. Other structures are preferably substantially the same as those according to the first and second preferred embodiments.

According to the third preferred embodiment, the conductive plate 12 extends from the section 6A opposing the front surface of the circuit substrate to the end section 6B of the extended portion 6. Therefore, the size of the conductive plate 12 defining the antenna can be easily increased. In this way, for example, the antenna characteristic of the antenna element can be improved. Moreover, the heat transmitted from the circuit substrate 2 to the conductive plate 12 through, for example, a connecting member (a power feeding element) is easily diffused to the extended portion 6 of the card case 3. In this way, a temperature increase of the circuit substrate 2 can be prevented, and a temperature increase of the metal covers 7 and 8 caused by the heat generated at the circuit substrate 2 can be efficiently prevented.

A fourth preferred embodiment will be described below. In the description of the fourth preferred embodiment, the components that are the same as those according to the first to third preferred embodiments are represented by the same reference numerals as those according to the first to third preferred embodiments, and descriptions thereof are not repeated.

Figure 8:
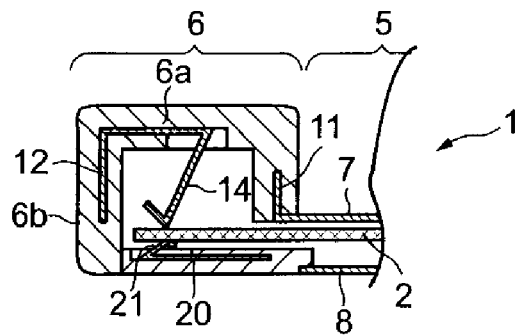
FIG. 8 is a schematic cross-sectional view illustrating a characteristic portion of a fourth preferred embodiment of the present invention.

According to the fourth preferred embodiment, as shown in the schematic cross-sectional view in FIG. 8, a conductive plate 12 defining an antenna element is embedded in the extended portion 6 of the card case 3 in the case wall section opposing the front surface of the circuit substrate. Moreover, a conductive plate 20 for constituting another antenna element is embedded in the extended portion 6 in the case wall section opposing the back surface of the circuit substrate. On the conductive plate 12, a connecting member 14 that extends from the conductive plate 12 to the surface of the circuit substrate 2, through the case wall, and resiliently pressure-contacts the front surface of the circuit substrate 2 is provided. On the conductive plate 20 defining the additional antenna element, a connecting member 21 that extends from the conductive plate 20 to the back surface of the circuit substrate 2, through the case wall, and resiliently pressure-contacts the back surface of the circuit substrate 2 is provided. The connecting members 14 and 21 are arranged to electrically connect the conductive plates 12 and 20, respectively, and the circuit for wireless communication on the circuit substrate 2.

According to the fourth preferred embodiment, the circuit substrate 2 housed inside the card case 3 is flexibly held between the connecting member 14 on the front side of the circuit substrate and the connecting member 21 on the back side of the circuit substrate by a resilient force.

The structures other than the above-described structures of the card apparatus 1 according to the fourth preferred embodiment are the same as the structures according to the first to third preferred embodiments. In the example shown in FIG. 8, the conductive plate 12 opposing the front surface of the circuit substrate is provided in an area extending from a section 6A opposing the front surface of the circuit substrate to an end section 6B of the extended portion 6. However, for example, depending on the specification, such as the antenna characteristic, required for the conductive plate 12, the conductive plate 12 may be embedded only in the section 6A opposing the front surface of the circuit substrate of the extended portion 6.

According to the fourth preferred embodiment, the circuit substrate 2 housed inside the card case 3 is flexibly held between the connecting members 14 and 21 from the front and back sides with a resilient force. Therefore, compared to a case in which the circuit substrate 2 is firmly fixed, for example, to the card case 3, when a force (for example, distortion) that causes the circuit substrate 2 to deform is applied to the circuit substrate 2, a portion of this force can be dispersed to reduce the stress applied to the circuit substrate 2.

A fifth preferred embodiment will be described below. In the description of the fifth preferred embodiment, the components that are the same as those according to the first to fourth preferred embodiments are represented by the same reference numerals as those according to the first to fourth preferred embodiments, and descriptions thereof are not repeated.

Figure 9A:
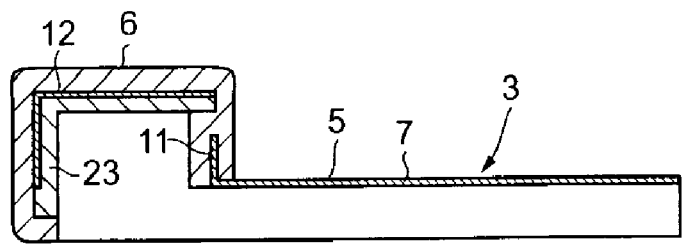
FIG. 9A is a schematic cross-sectional view illustrating a characteristic portion of a fifth preferred embodiment of the present invention.
Figure 9B:
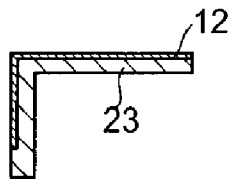
FIG. 9B is a cross-sectional view illustrating an example piece wall constituting the card apparatus according to the fifth preferred embodiment of the present invention.

In the card apparatus 1 according to the fifth preferred embodiment, as illustrated in the schematic cross-sectional view in FIG. 9A, the conductive plate 12 is fixed to the front surface of a wall piece 23 composed of resin material, such as that illustrated in FIG. 9B. The wall piece 23 is embedded in a portion of the case wall of the extended portion 6 so that the surface of the conductive plate 12 is disposed at the bottom of the portion of the case wall. In other words, the wall piece 23 functions as part of the case wall of the extended portion 6, and the conductive plate 12 fixed to the wall piece 23 is embedded inside the case wall of the extended portion 6.

The resin material used to form the wall piece 23 may be the same resin material as that used to form the other parts of the extended portion 6 or maybe a different material. The resin material used to form the wall piece 23 may be suitably selected by taking into consideration the strength of connection between the wall piece 23 and the other parts of the extended portion 6.

The structures other than the above-described structures of the card apparatus 1 according to the fifth preferred embodiment are preferably substantially the same as the structures according to the other above-described preferred embodiments. The card case 3 of the card apparatus 1 having a characteristic structure according to the fifth preferred embodiment can be produced as described below. For example, first, the conductive plate 12 for constituting the antenna element is obtained. Then, on one of the front surface and the back surface of the conductive plate 12 (in the example illustrated in FIG. 9A, the back side is selected), resin material for forming the wall piece is provided and cured to configure the wall piece 23, such as that illustrated in FIG. 9B.

Then, the wall piece 23 is disposed at a predetermined position inside a metal mold prepared in advance (i.e., a metal mold for forming the extended portion 6 and the frames 9 by using an injection molding technique). The metal cover 7 connected to the metal cover extension 11 is disposed at a predetermined position inside the metal mold. Then, melted resin material for forming the extended portion 6 and the frames 9 is injected into the metal mold. With this resin material, the entire conductive plate 12 of the wall piece 23, the metal cover extension 11 of the metal cover 7, and the edge portion of the metal cover 7 are covered. Then, the resin material is cured.

By carrying out such a production process, the card case 3 is produced. Subsequently, the circuit substrate 2 produced separately is housed inside the card case 3 to produce the card apparatus 1.

According to the fifth preferred embodiment, the conductive plate 12 is fixed to the front surface of the wall piece 23 composed of resin material. The wall piece 23 is embedded in a portion of the case wall of the extended portion 6 so that the surface of the conductive plate 12 is disposed at the bottom of the portion of the case wall. The wall piece 23 functions as part of the case wall of the extended portion 6. According to this configuration, the extended portion 6 with the conductive plate 12 embedded can be easily produced.

More specifically, when producing the extended portion 6 by using injection molding technology to embed the conductive plate 12 in the case wall of the extended portion 6, there is a problem in that it is difficult to support and fix the conductive plate 12 inside the metal mold for molding. Therefore, it is not easy to dispose and fix the conductive plate 12 at a predetermined position and a predetermined orientation inside the metal mold. Therefore, there is a problem in that it is difficult to produce the extended portion with the conductive plate 12 embedded at a position in accordance with the predetermined design. However, by forming the wall piece 23 including the conductive plate 12 so that it is embedded in the extended portion 6 as part of the case wall, the wall piece 23 can be disposed, for example, inside the metal mold so that the side of the wall piece 23 on which resin is applied is supported. In this way, the conductive plate 12 can be easily supported by and fixed to the metal mold at a position and an orientation according to a predetermined design. Accordingly, the extended portion 6 with the conductive plate 12 embedded therein can be easily produced.

The present invention is not limited to the first to fifth preferred embodiments, and various other preferred embodiments may be included in the scope of the invention. For example, according to the first to fifth preferred embodiments, the metal cover extension 11 is preferably disposed on the metal cover 7 that opposes the front surface of the circuit substrate 2. However, instead of the metal cover 7 opposing the front surface of the circuit substrate, a metal cover extension that extends from the metal cover 8 opposing the back surface of the circuit substrate and that is embedded in the case wall of the extended portion 6 may be provided on the metal cover 8. Furthermore, the metal cover extension 11 may be provided on the metal cover 7 opposing the front surface of the circuit substrate, and another metal cover extension may be provided on the metal cover 8 opposing the back surface of the circuit substrate.

Furthermore, according to the first to fifth preferred embodiments, the metal cover 7 opposing the front surface of the circuit substrate 2 and the metal cover 8 opposing the back surface of the circuit substrate 2 are preferably provided. However, instead, for example, only one of the metal cover 7 opposing the front surface of the circuit substrate and the metal cover 8 opposing the back surface of the circuit substrate may be provided. In this case, of course, the metal cover extension is connected to the metal cover.

Furthermore, according to the first and second preferred embodiments, the conductive plate 12 is preferably embedded in the case wall section of the extended portion 6 opposing the front surface of the circuit substrate. However, instead, for example, the conductive plate 12 may be embedded in the case wall section of the extended portion 6 opposing the back surface of the circuit substrate. According to the third preferred embodiment, the conductive plate 12 is preferably provided in the case wall section extending from the section 6A opposing the front surface of the circuit substrate to the end section 6B of the extended portion 6. However, instead, the conductive plate 12 may be provided in the case wall section extending from the section 6C opposing the back surface of the circuit substrate to the end section 6B of the extended portion 6. According to the fifth preferred embodiment, the wall piece 23 including the conductive plate 12 is disposed on the extended portion 6 on the side opposing the front surface of the circuit substrate. However, for example, the conductive plate 12 may be embedded in the case wall portion 6C of the extended portion 6 on the side opposing the back surface of the circuit substrate. In this case, the wall piece including the conductive plate 12 is embedded in the case wall portion 6C of the extended portion 6 on the side opposing the back surface of the circuit substrate.

According to the fifth preferred embodiment illustrated in FIG. 9A, the conductive plate 12 is preferably substantially L-shaped and is embedded in an area from the section opposing the front surface of the circuit substrate to the end section of the extended portion 6, and the wall piece 23 is preferably substantially L-shaped, corresponding to the shape of the conductive plate 12. However, the shape of the wall piece is not limited so long as the wall piece is constituted by providing resin material to at least a portion of the at least one of the front surface and the back surface of the conductive plate 12 for constituting the antenna element. For example, the wall piece may be constituted by providing a resin material on only a section of the conductive plate 12 that is embedded in the section opposing the front surface of the circuit substrate.

The card apparatus according to preferred embodiments of the present invention and the method of producing a card apparatus according to preferred embodiments of the present invention relate to a card apparatus having a wireless communication function. According to preferred embodiments of the present invention, a conductive plate for constituting an antenna element is embedded in a case wall of a card case. Therefore, the present invention is suitable for a small, portable card apparatus having a wireless communication function.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A card apparatus comprising:
   a circuit substrate; and
   a card case arranged to accommodate the circuit substrate;
   wherein
   the card case includes a case main body and an extended portion made of resin material and being integral with the case main body, the extended portion accommodating one end of the circuit substrate;
   the case main body includes a metal cover disposed opposite to at least one of a front surface and a back surface of the circuit substrate; and
   a metal cover extension extending from the metal cover and including a first conductive plate that is embedded in a case wall that defines the extended portion, and a second conductive plate constituting an antenna element that is embedded in the case wall that defines the extended portion, the second conductive plate being spaced at a predetermined distance apart from the metal cover extension.

2. The card apparatus according to claim 1, wherein a connecting member extending from the second conductive plate to the circuit substrate in the card case through the case wall of the extended portion is connected to the second conductive plate constituting the antenna element and is embedded in the case wall of the extended portion, a resilient portion arranged to apply a resilient force so as to resiliently pressure-contact the connecting member to a surface of the second circuit substrate is provided in the connecting member, and the second conductive plate constituting the antenna element and a circuit on the circuit substrate are electrically connected via the connecting member.

3. The card apparatus according to claim 1, wherein an opening exposing a portion of the second conductive plate constituting the antenna element is provided in the inner wall of the case wall of the extended portion, a connecting member extending from the circuit substrate to the second conductive plate constituting the antenna element through the opening in the extended portion is provided on the circuit substrate, the connecting member being arranged to contact-connect with the second conductive plate constituting the antenna element, and the conductive plate constituting the antenna element and a circuit of the circuit substrate are electrically connected via the connecting member.

4. The card apparatus according to claim 1, wherein the extended portion includes a wall portion extending from one side of the front surface and the back surface of the end area of the circuit substrate to the outer area of the end surface of the circuit substrate and the second conductive plate constituting the antenna element and being embedded in the case wall of the extended portion is embedded in a section of the case wall of the extended portion extending from at least one side of the front end and the back end of the circuit substrate to the outer area of the end surface of the circuit substrate.

5. The card apparatus according to claim 1, wherein the extended portion extends from the front surface side of the end area of the circuit substrate housed in the case to the back surface side of the circuit substrate through the outer area of the end surface of the circuit substrate, the second conductive plate constituting the antenna element is embedded in each of the case wall portion of the extended portion opposing the front side of the circuit substrate and the case wall portion of the extended portion opposing the back side of the circuit substrate, a first connecting member extending from the second conductive plate to the front surface of the circuit substrate through the case wall of the extended portion is connected to the second conductive plate constituting the antenna element and being embedded in the case wall section of the extended portion opposing the front surface of the circuit substrate, the first connecting member being arranged to resiliently pressure-contact the front surface of the circuit substrate, and a second connecting member extending from the second conductive plate to the back surface of the circuit substrate through the case wall of the extended portion is connected to the second conductive plate constituting the antenna element and being embedded in the case wall section of the extended portion opposing the back surface of the circuit substrate, the second connecting member being arranged to resiliently pressure-contact the front surface of the circuit substrate, and the circuit substrate is held between the first connecting member opposing the front surface of the circuit substrate and the second connecting member opposing the back surface of the circuit substrate with a resilient force.

6. The card apparatus according to claim 1, wherein the second conductive plate constituting the antenna element is fixed to a surface of a wall piece made of resin material, the wall piece including the second conductive plate constituting the antenna element is embedded in a portion of the case wall of the extended portion, the surface of the wall piece on which the second conductive plate constituting an antenna element defines the embedding-side surface, and the wall piece defines part of the case wall of the extended portion.

7. A method of producing a card apparatus, the card apparatus including a circuit substrate, and a card case arranged to accommodate the circuit substrate, wherein the card case includes a case main body and an extended portion made of resin material and being integral with the case main body, the extended portion accommodating one end of the circuit substrate, the case main body includes a metal cover disposed opposite to at least one of a front surface and a back surface of the circuit substrate, and a metal cover extension extending from the metal cover and including a first conductive plate is embedded in a case wall constituting the extended portion, and a second conductive plate constituting an antenna element is embedded in the case wall constituting the extended portion, the second conductive plate being spaced at a predetermined distance apart from the metal cover extension, the method comprising the steps of:

obtaining a conductive plate having a structure in which the metal cover extension of the metal cover and the second conductive plate constituting the antenna element are connected by a connecting element;

subsequently embedding in the case wall constituting the extended portion the metal cover extension and the second conductive plate constituting the antenna element and producing the extended portion having a hole for exposing the connecting element by using injection molding technology; and subsequently using the hole to cut the connecting element between the metal cover extension and the second conductive plate constituting the antenna element to separate the metal cover extension from the second conductive plate constituting the antenna element.

8. A method of producing a card apparatus, the card apparatus including a circuit substrate, and a card case arranged to accommodate the circuit substrate, wherein the card case includes a case main body and an extended portion made of resin material and being disposed integrally with the case main body, the extended portion accommodating one end of the circuit substrate, the case main body includes a metal cover disposed opposite to at least one of a front surface and a back surface of the circuit substrate, and a metal cover extension extending from the metal cover and including a first conductive plate is embedded in a case wall constituting the extended portion, and a second conductive plate constituting an antenna element is embedded in the case wall constituting the extended portion, the second conductive plate being spaced at a predetermined distance apart from the metal cover extension, the method comprising the steps of:

obtaining the second conductive plate constituting the antenna element;

forming a wall piece on a portion of one of the surfaces of the extended portion by applying and curing resin material on one of a front surface and a back surface of the second conductive plate constituting the antenna element;

subsequently disposing the wall piece at a predetermined position in a metal mold for injection-molding the extended portion and disposing the metal cover extension at a predetermined position in the metal mold; and subsequently forming the extended portion in which the metal cover extension and the second conductive plate constituting the antenna element is embedded by injecting resin material for constituting the extended portion into the metal mold to cover the metal cover extension of the metal cover with the resin material and to cover the second conductive plate constituting the antenna element of the wall piece with the resin material.

* * * * *